United States Patent [19]

Andrew et al.

[11] 4,320,905
[45] Mar. 23, 1982

[54] VEHICLE FOR ICE AND SNOW

[76] Inventors: Edward Andrew, 21 Valley View Rd., Verona, N.J. 07044; Gerard Bello, 225 Walnut St., Montclair, N.J. 07042

[21] Appl. No.: 956,846

[22] Filed: Nov. 2, 1978

[51] Int. Cl.³ .............................................. B62B 13/00
[52] U.S. Cl. .................................. 280/12 H; 280/18; 280/609; 441/65
[58] Field of Search ............ 280/18, 19, 12 H, 12 KL, 280/12 K, 12 R, 606, 607, 609, 601, 11.12, 11.18; 9/310 E, 310 B, 310 A, 310 R

[56] References Cited

U.S. PATENT DOCUMENTS

| | | |
|---|---|---|
| 1,812,252 | 6/1931 | Wels ................................ 280/21 R |
| 1,823,942 | 9/1931 | Jung ................................ 280/11.12 |
| 2,139,513 | 12/1938 | Nelson et al. ........................ 280/18 |
| 2,266,842 | 12/1941 | Angell ............................ 280/12 KL |
| 2,317,414 | 4/1943 | Smith .................................. 280/18 |
| 2,389,729 | 11/1945 | Howland ............................ 9/310 E |
| 2,829,902 | 4/1958 | Stocker ................................ 280/18 |
| 3,079,617 | 3/1963 | Brasch ...................... 280/12 KL X |
| 3,332,697 | 7/1967 | Hagen ............................ 280/12 R |
| 3,370,863 | 2/1968 | Schrall ............................ 280/21 R |
| 3,394,944 | 7/1968 | Lowes, Jr. ........................ 280/12 R |
| 3,414,284 | 12/1968 | Rosekrans, Jr. et al. ............. 280/18 |
| 3,453,000 | 7/1969 | Asher ................................ 280/18 |
| 3,617,070 | 11/1971 | Roberts ............................ 9/310 B |
| 3,628,804 | 12/1971 | Carreiro ............................ 280/18 |
| 3,759,537 | 9/1973 | Schreiber ............................ 280/16 |
| 3,773,345 | 11/1973 | Mitchell ............................ 280/21 R |
| 3,807,342 | 4/1974 | Turner ............................ 9/310 B X |
| 3,833,234 | 9/1974 | Schreiber ........................ 280/21 A |
| 3,840,241 | 10/1974 | Hock .................................. 280/16 |
| 3,901,526 | 8/1975 | Scott et al. ........................ 280/21 R |
| 3,937,482 | 2/1976 | Johnson .............................. 280/18 |
| 3,948,536 | 4/1976 | Konrad ................................ 280/18 |
| 4,063,746 | 12/1977 | Hansen ............................ 280/21 R |
| 4,077,638 | 3/1978 | Lund ................................ 280/21 R |

FOREIGN PATENT DOCUMENTS 79934 3/1952 Norway ................................ 280/18

Primary Examiner—Joseph F. Peters, Jr.
Assistant Examiner—Milton L. Smith
Attorney, Agent, or Firm—Ronald G. Goebel

[57] ABSTRACT

A vehicle for snow and ice which is ridden by standing thereon is provided with a boat-like hull section having a bottom and curved upwardly at its forward and after ends. At least two outer longitudinal runners are located on the outer portions of the bottom. Preferably, a center longitudinal runner is located between the outer runners and may extend to the forward and after ends of the hull section. To accommodate the feet of a rider, forward and after platform members are mounted on each end of the hull which members are preferably tilted upwardly. A center platform member is mounted atop the hull section between the forward and after platform members.

In other embodiments, a portion of the center runner at its forward end is serrated to allow frontal pivoting and acrobatic exercises. In still another embodiment there is provided a braking means consisting of a serrated triangular block mounted on the undersurface of the after platform member which digs into ice or snow in response to rearward pressure on the after platform member.

18 Claims, 8 Drawing Figures

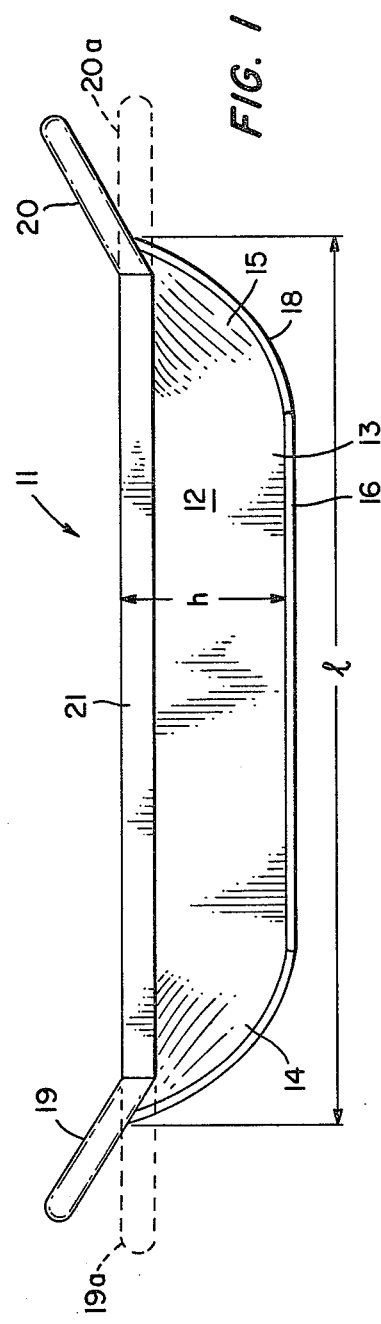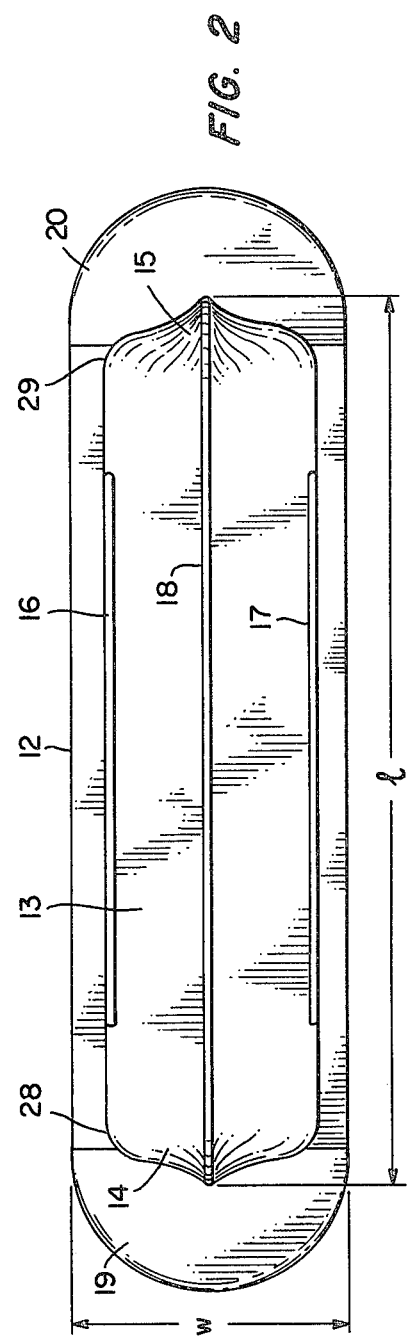

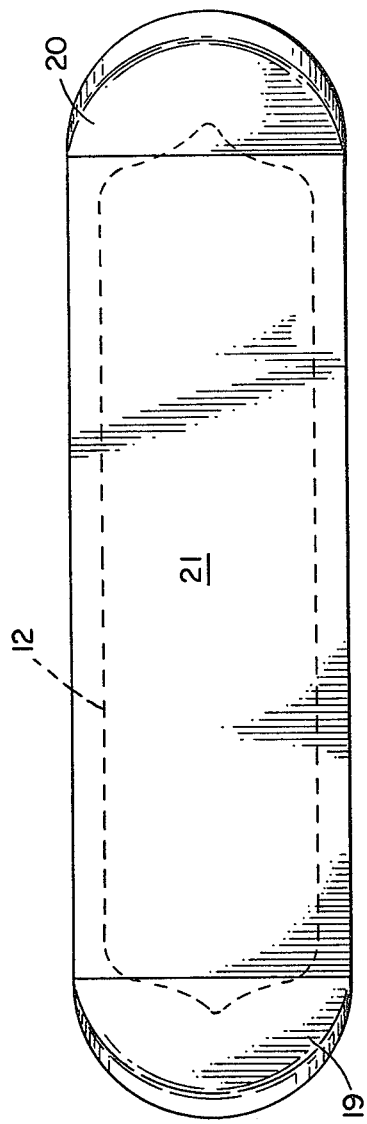
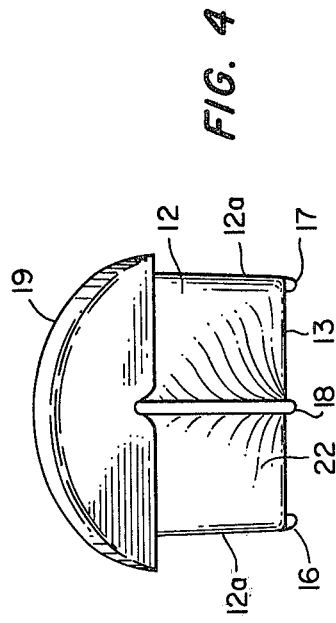

VEHICLE FOR ICE AND SNOW

BACKGROUND OF THE INVENTION

This invention deals with a vehicle for snow and ice which is ridden by standing thereon.

In the past, many snow and ice vehicles such as sleds and toboggans have been described in the art which are designed to seat one or more riders. Such vehicles are usually steered or maneuvered by means such as a rudder, wheel or specially constructed runners associated with the vehicle or by tilting or jerking the vehicle.

In U.S. Pat. No. 3,937,482 to Merlin Johnson for example, a self-uprighting tow sled is provided which comprises a hull having its front and rear portions upwardly and laterally curved to form a rounded front and rear. The rear portion must lie in a horizontal plane no higher and preferably lower than the plane in which the front portion lies or the sled will not be self-righting. The bottom of the sled has a number of runners made unitary with the hull. Preferably at least three runners are in a straight-line, parallel relationship extending from the front to the rear of the sled. Curved outwardly from the straight runners are curved runners which can be curved at the front end and straight or curved at the rearward end. It is important that the curved runners extend forwardly over most of the bottom side of the front of the sled. The curved runners allow the towed sled to be turned by the passengers leaning towards one side or the other to allow the curved runners to bite into the snow and turn the sled.

In U.S. Pat. No. 3,617,070 to A. C. Roberts, a single rider gliding vehicle for snow and water is described which is steered by the tilting or jerking of the vehicle body. It is generally characterized by having a seat assembly and crossbrace, a tow latch, and handholds. The body part of the vehicle comprises a generally flat bottom which flares from front to rear and which is curved upward at its forward end so that the forward motion of the vehicle will tend to raise the vehicle to or toward the surface of the snow or water. Side portions of the body flare upward and outward and terminate in two wing portions. The bottom of the vehicle includes two protruding, spaced parallel runners which can be made unitary with the bottom, which runners decrease progressively and evenly in width and depth from the front to rear until they each terminate at a point. The sides of each runner meet at an angle of 60°. The tapering width and depth of the runners, and the tapering width of the bottom sides and wings tend to point in the direction in which the propelling force is acting.

U.S. Pat. No. 3,453,000 to R. J. Asher provides a flat rescue sled having three runners located on the underside of the body portion; a pair of longitudinal runners located on opposite edges of the bottom and a third central runner located along the centerline of the bottom from the front end to a point at least a third of the way back from the front end. A platform for the rider's chest is provided at the front end.

The present invention, unlike the above-described patents, provides a runnered vehicle for ice and snow which is ridden and maneuvered by standing thereon. Accordingly, the vehicle of this invention can be made smaller than prior art sleds, does not contain seating compartments, and is characterized by having platform members mounted thereon to accommodate the feet of a rider. In addition, the present invention provides a novel braking means for the vehicle and a runner design which allows pivoting of the vehicle on its forward end.

SUMMARY OF THE INVENTION

The present invention provides a vehicle for snow and ice which can be ridden by standing thereon and comprises a boat-like hull section having a bottom, an upwardly curved forward end and an upwardly curved after end. Extending along the bottom of the hull section are at least two parallel runners. Preferably these runners comprise two outer runners which extend along the outer portions of the bottom and a center runner which extends along the central portion of the hull section between the outer runners. The center runner preferably extends to the forward end and to the after end of the hull section. If desired the outer runners may also so extend.

Mounted atop the forward end of the hull section is a forward platform member and mounted atop the after end is an after platform member, which forward and after platform members provide an area for the rider to place his feet in mounting, riding and manuevering the vehicle over snow or ice. Located between the forward and after platform members atop the hull section is a central platform member which may also be used as a support for the feet of the rider. Although the forward and after platform members may be substantially horizontal, it is preferred that each member be tilted upwardly toward the forward and after ends, respectively, of the hull section in order to provide optimum balance and support for the rider and to allow the rider to shift his weight more easily.

In other embodiments of this invention, a snow vehicle as described above is provided having additionally, a braking means located on the after platform member. This braking means preferably comprises a triangular block mounted on the lower surface of the after platform member having its outer spectral edge serrated for digging into ice or snow in response to downward foot pressure on the after platform member.

In still another embodiment of this invention, a portion of the center runner which extends to the forward section of the vehicle is serrated to provide a means of gripping snow or ice at the forward end of the vehicle to allow acrobatic turns and pivots about the forward end of the vehicle.

BRIEF DESCRIPTION OF THE DRAWINGS

FIG. 1 shows a side view of the snow and ice vehicle of this invention.

FIG. 2 shows a bottom view of the vehicle of FIG. 1.

FIG. 3 shows the top view of the vehicle of FIG. 1.

FIG. 4 shows a forward end view of the vehicle of FIG. 1.

DETAILED DESCRIPTION OF THE PREFERRED EMBODIMENTS

Figure 5:
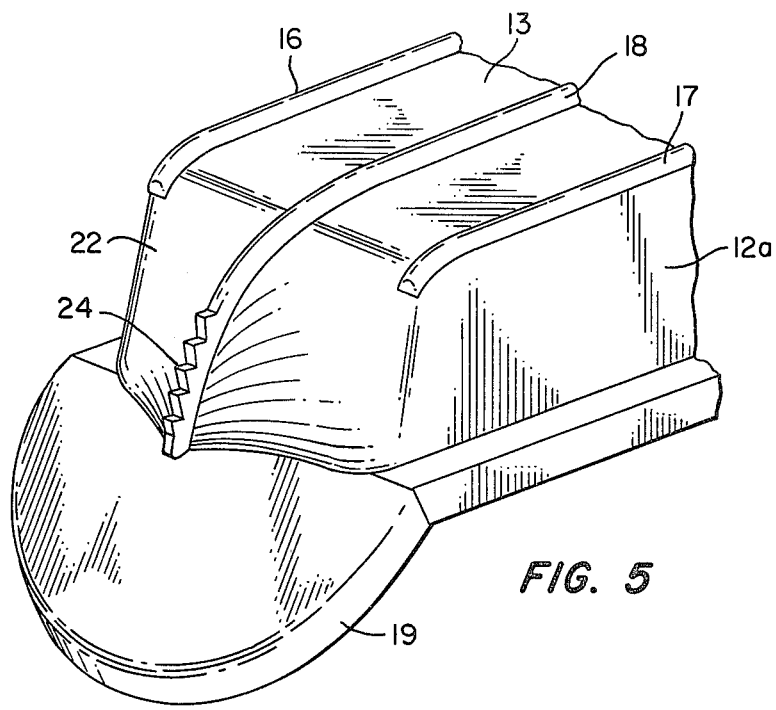
FIG. 5 shows a perspective forward end view of a vehicle according to this invention wherein a portion of the center runner is serrated.

FIGS. 1, 2, 3 and 4 show a side view, bottom view, top view and front end view, respectively, of the vehicle of this invention. The vehicle is indicated generally by 11 and comprises a boat-like hull section 12 having a bottom 13 which can be substantially flat or slightly curved and which curves upwardly at the forward end 14 of the hull section and at the after end 15. Extending longitudinally along the outside portions of the bottom 13 are a pair of outer runners 16 and 17 which are the main support and sledding runners for the vehicle as it rides on snow or ice. Extending longitudinally along the center of the bottom 13 between outer runners 16 and 17 is center runner 18. This runner preferably extends to the forward end 14 and after end 15 of the hull section 12.

FIG. 4 shows a front end view of the vehicle which view is substantially identical to the after view when said center runner is extended to both the forward and after ends. The sides 12a of hull section 12 can be substantially vertical as shown in FIG. 4 or curved slightly inwardly or outwardly from the hull. The surface 22 of the hull section 12 at this forward end flares inwardly and then outwardly from the forward portion of the center runner 18 toward the outer portions of the hull section; the flare being most accentuated at the upper portion of the forward end and least accentuated at the lower portion of the forward end where it meets bottom 13. This flared configuration causes snow or ice to be pushed outwardly towards the hull sides 12a and downwardly along the bottom between the runners as the vehicle is moved therealong. This will be discussed in more detail hereafter in connection with FIG. 5.

Mounted atop the hull section at the forward end thereof is a forward platform member 19. Mounted atop the hull section at the after end is after platform member 20. A central platform member 21 is preferably mounted on the hull section between the forward and after platform members 19 and 20. The function of the forward and after platform members is to provide an area at each end of the vehicle on which to place each foot while riding the vehicle to enable the rider to maintain his balance, shiftweight and to maneuver the vehicle. The central platform may also be used for standing as desired by the rider during use of the vehicle for further balance and control.

As shown in FIG. 1, the forward and after platform members, 19 and 20 are tilted upwardly toward the forward and after ends, respectively, of the hull section. Such tilting enhances the rider's ability to maintain his balance on the vehicle and in maneuvering the vehicle. The platform members may also be utilized, that is, mounted atop the hull section at an angle of 0° with respect to the horizontal as shown by dotted lines 19a and 20a in FIG. 1. However, it is preferred to have each platform member mounted in an upwardly tilted position toward their respective ends of the hull section at angles varying from about 5° to about 45° from the horizontal and more preferably at about 30° from the horizontal. In order to provide adequate traction the platform members should be made of or have their upper surfaces made of a non-skid material such as used on boat decks.

The forward and after platform members 19 and 20 are preferably rounded at their edge portions to prevent snagging of the vehicle against obstacles.

The hull section is preferably hollow to reduce the overall weight of the vehicle. Both the hull and runners can be made unitary out of any suitably strong and rigid material such as wood, fiberglass, metal, plastic or glass, for example, or the runners can be made separately and mounted on the hull section. It is preferred, however, to fabricate the hull section out of plastic, fiberglass or wood and attach runners of steel thereto. The platform members 19, 20 and 21 in this case are mounted separately on the hull section. The length overall of the hull section 1, i.e. from the forward to the after end is from about 12 inches to 48 inches and preferably from about 20 to 36 inches. The overall width w of the hull section is from about 4 to 10 inches, and preferably 6 to 8 inches. The forward and after platform members extend outwardly from each end of the hull section from about 1 to 3 inches. The height h of the vehicle should be from about 3 to 8 inches and preferably from about 3 to 6 inches. The center platform member 21 overlaps the sides of the hull section by about 1 inch.

Figure 8:
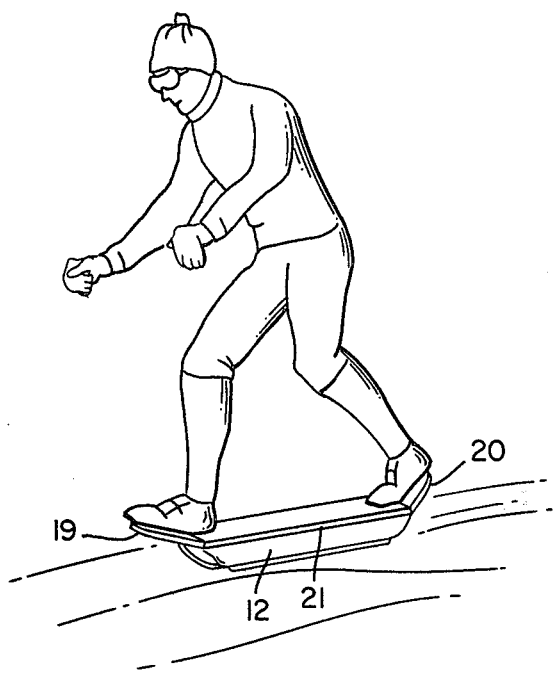
FIG. 8 shows the vehicle of this invention being ridden by a rider standing thereon.

The vehicle of this invention can be used for both recreational and acrobatic sledding on ice and snow. The rider mounts the vehicle by placing each of his feet on one or more platform members and guiding the vehicle down or across a snow or ice surface as shown in FIG. 8. The flared configuration of the forward end of the hull section enables the vehicle to cut through snow or ice while forcing the vehicle above the snow or ice in a manner similar to a boat on water. This design also enables the rider to direct and control the forward direction of the vehicle. In addition to the support and stabilizing function of the outer runners, 16 and 17, they also allow the rider to control the direction of the vehicle by shifting his weight to one side, thereby forcing the outer runner on the overweighted side to cut into the snow or ice more deeply thereby turning the vehicle toward the overweighted side. The center runner 18 provides additional stabilizing control in the direction of movement of the vehicle and when extended to the forward end of the hull section, provides a cutting action to direct motion of the snow vehicle through hard or packed snow or ice. By shifting the rider's weight to the forward and after platform members 19 and 20 additional control of the vehicle is obtained. For example, by shifting weight to either the forward or after platform member control of turning, steering, acceleration and deceleration can be achieved.

By extending the center runner 18 both to the forward end and after end of the hull section and shifting weight to either the forward or after platform members, pivoting or tight turning of the vehicle can be achieved. The rider can also utilize the center platform member for balancing and maneuvering.

FIG. 5 is a perspective forward end view of an embodiment of the present invention wherein the center runner has a portion thereof serrated at the forward section where it curves upwardly toward the forward end of the vehicle. This serrated portion is shown generally by 24. The function of the serrated section of the center runner is to allow digging of the forward section into snow and ice in response to a forward weight shift for sharp turns and acrobatic exercises on the vehicle. This embodiment also shows the outer runners 16 and 17 extending slightly forward towards the upper end of the hull.

FIG. 5 also shows in more detail the flared configuration of the forward end of the hull previously mentioned in connection with FIG. 4. At the junction of the center runner 18 with the forward platform member 19 the flare of the hull to the sides 12a of the bottom 13 is relatively deep and wide i.e. accentuated. This accentuation is diminished, that is, becomes shallower and narrower as the forward end of the hull section curves toward the hull bottom 13 until it blends into the substantially flat contour of the bottom 13. Snow or ice moving against the vehicle in its forward motion when the vehicle is in its riding position (i.e. FIG. 5 upside down) is pushed outwardly towards the hull sides by the accentuated flare of the hull at its forward upper end and downwardly towards the bottom of the vehicle between the runners at its rear lower end by virtue of the ever diminishing flare of the lower end. This outward and downward pushing assists the vehicle in riding stably and over ice and snow.

Figure 6:
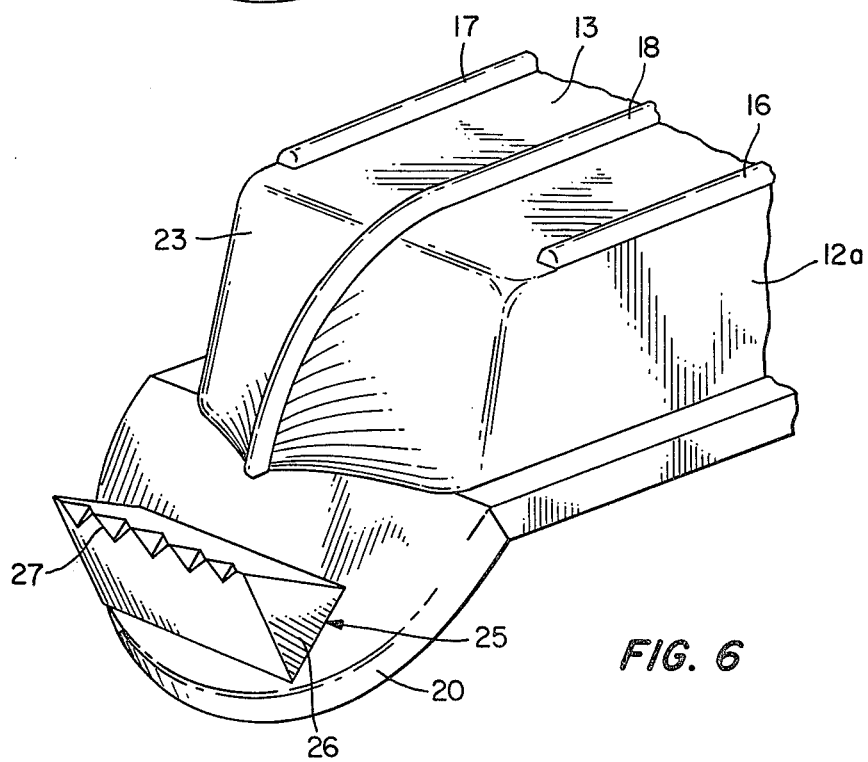
FIG. 6 is a perspective after end view of a vehicle according to this invention showing a preferred braking means for the vehicle.

FIG. 6 is a perspective after end view of an embodiment of the vehicle of this invention which has a similar flared surface configuration 23 as the forward end view and which also includes a braking means to stop the vehicle. The braking means 25 as shown in FIG. 5 comprises a triangular block 26 mounted across the bottom of after platform member 20 wherein the outer edge, that is the edge pointing downwardly from the platform member, is formed with a number of serrations 27.

In using the braking means the rider shifts his weight to the after platform member 20 causing the vehicle to tilt backwardly and the serrated edge 27 of triangular block member 26 to dig into the ice or snow thereby stopping the vehicle. It should be mentioned that the serrated triangular block as shown in FIG. 6 is only a preferred means for stopping the vehicle. Other braking means such as protruding pegs or treads mounted in the bottom of the platform or through the platform will also suffice. The inwardly and outwardly flaring surface 23 of the after end is also shown in FIG. 6.

Figure 7:
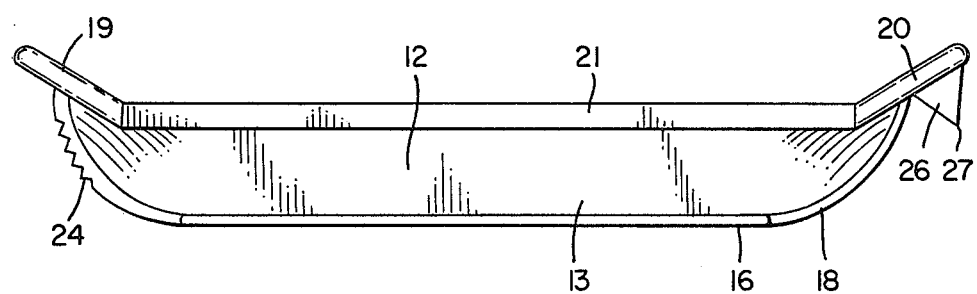
FIG. 7 is a side view of a vehicle of this invention showing the embodiments of FIGS. 5 and 6.

FIG. 7 is a side view of a vehicle according to this invention which shows the serrated center runner section 24 and the serrated triangular block 26 braking means located on the forward and after end of the vehicles as shown in FIGS. 5 and 6.

The best mode contemplated in this invention comprises a snow or ice vehicle having a hollow hull of boat-like configuration; that is a substantially flat bottom, an upwardly curved forward end, an upwardly curved after end and substantially vertical sides. The two outer parallel runners extend along the outside portion of the bottom and the center runner extends along the center portion of the bottom between the outer runners up to the forward and after ends of the vehicle. The forward and after platform members are mounted atop the hull in an upwardly tilting position at an angle of about 30° from the horizontal with the center platform member therebetween. The length overall is 24 inches; the beam width is 7 inches; and the height h is 4 inches. The triangular block braking means and serrated center runner section are also included.

It is also within the scope of this invention to provide a vehicle having just a single central platform member and no forward and after platform members or a single central platform member of sufficient length to extend to or overlap the forward and after ends of the vehicles thereby obviating the need for additional untilted forward and after platform members.

We claim:

1. A vehicle for snow and ice ridden by standing comprising:
    (a) a boat-like hull section having a substantially flat bottom, an upwardly curved forward end and an upwardly curved after end;
    (b) a pair of outer parallel runners extending along the outer portions of said bottom;
    (c) a center runner extending along the center portion of said bottom to the forward end of said hull section;
    (d) a forward platform member mounted atop said hull section at the forward end thereof, said forward platform member being inclined toward the forward end of said hull section; and
    (e) an after platform member mounted atop said hull section at the after end thereof; said after platform member being inclined toward the after end thereof.

2. The vehicle of claim 1 wherein said hull section is hollow.

3. The vehicle of claim 1 which further comprises a central platform member mounted atop said hull section between said forward and after platform members.

4. The vehicle of claim 1 wherein each of said forward and after platform members are inclined at an angle of from 5° to about 45° with respect to the horizontal.

5. The vehicle of claim 1 which further comprises a means for braking said vehicle on said after platform member.

6. The vehicle of claim 5 wherein said braking means comprises a triangular block member having an outer serrated edge mounted under said after platform member.

7. The vehicle of claim 1 wherein a portion of said center runner at the forward end of said hull section is serrated.

8. The vehicle of claim 1 wherein the forward end of said hull section flares inwardly and outwardly toward the sides of the hull section.

9. A vehicle for ice and snow ridden by standing comprising:
    (a) a hollow boat-like hull section having a substantially flat bottom, an upwardly curved forward end and an upwardly curved after end;
    (b) a pair of outer parallel runners extending along the outer portions of said bottom;
    (c) a center runner extending along the center portion of said bottom to the forward end of said hull section;
    (d) a forward platform member mounted atop said hull section at the forward end thereof, said forward platform member being inclined toward the forward end of said hull section at an angle of from 5° to about 45° with respect to the horizontal;
    (e) an after platform member mounted atop said hull section at the after end thereof; said after platform member being inclined toward the after end of said hull section at an angle of from 5° to about 45° with respect to the horizontal; and
    (f) a central platform member mounted atop said hull section between said forward and after platform members.

10. The vehicle of claim 9 further comprising a triangular block having an outer serrated edge mounted under said after platform member.

11. The vehicle of claim 9 wherein a portion of said center runner at the forward end of said hull section is serrated.

12. The vehicle of claim 9 having a length overall of from about 12 inches to about 48 inches.

13. The vehicle of claim 9 having a width of from about 4 to 10 inches.

14. The vehicle of claim 9 having a height of from about 3 to 8 inches.

15. The vehicle of claim 9 wherein the forward end of said hull section flares inwardly and outwardly towards the sides of said hull section, the flare of the upper end of said forward end being more accentuated than the flare at the lower end of said forward end.

16. A vehicle for snow and ice ridden by standing thereon comprising:
(a) a boat-like hull section having a bottom, an upwardly curved forward end and an upwardly curved after end,
(b) at least two parallel runners extending along said bottom;
(c) a forward platform member mounted atop said hull section at the forward end thereof and an after platform member mounted atop said hull section at the after end thereof; and
(d) means for braking said vehicle located on said after platform member.

17. The vehicle of claim 10 wherein said braking means comprises a triangular block having an outer serrated edge mounted under said after platform member.

18. A vehicle for snow and ice ridden by standing thereon comprising:
(a) a boat-like hull section having a bottom, an upwardly curved forward end, and an upwardly curved after end, said forward end being flared inwardly and outwardly toward the sides of said hull section;
(b) at least two parallel runners extending along said bottom;
(c) at least one platform member for standing thereon mounted atop said hull section.

* * * * *